United States Patent [19]
Ma

[11] Patent Number: 5,609,021
[45] Date of Patent: Mar. 11, 1997

[54] OPERATION OF AN INTERNAL COMBUSTION ENGINE

[75] Inventor: Thomas T. Ma, South Woodham Ferrers, Great Britain

[73] Assignee: Ford Motor Company, Dearborn, Mich.

[21] Appl. No.: 244,183

[22] PCT Filed: Nov. 2, 1992

[86] PCT No.: PCT/GB92/02012

§ 371 Date: May 17, 1994

§ 102(e) Date: May 17, 1994

[87] PCT Pub. No.: WO93/10337

PCT Pub. Date: May 27, 1993

[30] Foreign Application Priority Data

Nov. 22, 1991 [GB] United Kingdom .................. 9124855

[51] Int. Cl.$^6$ ........................................... F01N 3/20
[52] U.S. Cl. ........................ 60/274; 60/285; 60/286; 60/289
[58] Field of Search ............... 60/274, 285, 289, 60/311, 290, 286

[56] References Cited

U.S. PATENT DOCUMENTS

| | | | |
|---|---|---|---|
| 3,791,145 | 2/1974 | Yamamoto | 60/286 |
| 3,906,723 | 9/1975 | Matumoto | 60/290 |
| 4,391,095 | 7/1983 | Virk | 60/286 |
| 4,614,184 | 9/1986 | Hansen | 60/289 |
| 5,085,049 | 2/1992 | Rim | 60/289 |
| 5,090,200 | 2/1992 | Arai | 60/289 |
| 5,133,184 | 7/1992 | Geiger | 60/286 |

*Primary Examiner*—Douglas Hart
*Attorney, Agent, or Firm*—Jerome R. Drouillard

[57] ABSTRACT

A method is described of operating an internal combustion engine burning a fuel containing carbon and hydrogen, to provide a flame in the exhaust system to heat a catalytic converter or burn off the soot in a particulate filter trap. The method involves reducing the intake throttle opening during deceleration mode below the throttle opening for the steady speed idle position to create a proportion of combustible gases in the exhaust gas stream. By ensuring at the same time the presence in the exhaust gas stream of additional air, an ignitable mixture is produced which is ignited to burn as a flame in an afterburner chamber of the exhaust system. By selecting deceleration periods to enrich the mixture excessively in this manner, adverse effects on drivability go unnoticed.

13 Claims, 1 Drawing Sheet

OPERATION OF AN INTERNAL COMBUSTION ENGINE

FIELD OF THE INVENTION

The present invention relates to a method of operating an internal combustion engine burning a fuel, such as petrol, diesel fuel or alcohol, containing carbon and hydrogen.

BACKGROUND OF THE INVENTION

As is known, an exhaust catalytic converter only performs its task of reducing the unburnt hydrocarbons, carbon monoxide and oxides of nitrogen content of the exhaust gases after it has reached a critical temperature, termed the light-off temperature, which is between 300° C. and 400° C. In the case of an internal combustion engine in which very lean mixtures are burnt under light load conditions, the excess air tends to cool the catalytic converter making it difficult for the latter to remain above the light-off temperature under certain conditions, notably during idling. To some extent, this problem can be counteracted by placing the converter nearer to the engine (close coupling) but the converter may then not be able to withstand the temperature at full load. Ideally therefore, the converter should be kept sufficiently far away from the engine to allow safe full load operation, but means should be provided for heating the catalyst when it risks dropping below its light-off temperature.

Diesel engines tend to produce soot in their exhaust gases and are required to have a filter trap in order to meet regulations for reducing toxic emissions from engines. Such filter traps tend to be blocked by the soot particles after some time and various proposals have been made for regenerating the filter trap. One way is to burn off the soot and it is known that if burning is started by an external heat source at the front face of the filter trap, the exothermic reaction will itself spread along the length of the trap in a manner similar to the burning of a cigarette when air is drawn through it.

OBJECT OF THE INVENTION

Thus, in both diesel and petrol engines, it is desirable to be able at certain times to generate heat within the exhaust system and the present invention seeks to provide a method of operating the engine to create such a heat source under selected conditions.

SUMMARY OF THE INVENTION

The present invention provides a method of operating an internal combustion engine burning a fuel, such as petrol, diesel fuel or alcohol, containing carbon and hydrogen, which method comprises the steps of determining when the engine is operating in a deceleration mode, reducing the throttle opening of the air intake to the engine only during deceleration modes below the throttle opening for steady speed idling to reduce the mass of air in each combustion charge when the engine is overrunning while continuing to admit fuel into the combustion chamber to result in excessively rich combustion in at least a region of the combustion charge and thereby create a proportion of combustible gases in the exhaust gas stream, ensuring the presence in the exhaust gas stream of additional air from an external source or unused air from the engine to mix with the combustible gases to achieve during deceleration modes an exhaust mixture having sufficiently high concentrations of combustible gases and oxygen to be ignitable, and igniting the mixture to burn as a flame within an afterburner chamber arranged upstream of an element of the exhaust system, such as a catalytic converter or a filter trap, in order to heat the element during deceleration modes.

To ensure reliable ignition of the exhaust mixture, the engine in the present invention is run with more severe throttling than during steady speed idling in order to produce a very rich mixture even with a small quantity of fuel admitted into the combustion chamber during deceleration modes and this mixture undergoes incomplete combustion resulting in the exhaust gases having a sufficiently high concentration of combustible gases, especially hydrogen and carbon monoxide, to be easily ignitable.

The invention can be applied to different types of engines. The charge preparation may be homogeneous or stratified, ignition may be by spark or by compression and the engine may operate on a two-stroke or four-stroke cycle.

With a stratified charge petrol or diesel engine, to ensure reliable ignition in the afterburner, the engine should be run to produce a sufficient concentration of combustible gases, especially hydrogen and carbon monoxide, from local regions (pockets) of incomplete combustion mixed with sufficient concentration of oxygen from other local regions of unused air to form an easily ignitable mixture in the exhaust system.

If necessary, the intake air may be throttled even more severely to below the minimum air supply required for complete combustion of the fuel so as to produce an even higher concentration of hydrogen, additional air being then introduced into the exhaust system to supplement the unused air from the engine to enable complete combustion in the afterburner.

The additional air may be supplied from a variety of sources. If a continuously driven air compressor is available, air from it may be diverted to the exhaust system by an isolation valve which is opened during deceleration modes. If a turbocharger is used on the engine, the air pressure which it generates while running down in speed during deceleration modes may be diverted from the intake system to the exhaust system. Lastly, an air scoop may be provided to create a positive pressure when the vehicle is moving. Such ram air will not be at a pressure as high as that produced by a compressor or turbocharger but because the exhaust back pressure is minimal during deceleration modes, this pressure can be sufficient. A still further possibility is to supply only some engine cylinders with excess fuel while cutting off the fuel supply to other engine cylinders entirely. The cylinders receiving no fuel will act merely as an air pump to supply air into the exhaust system for mixing with the combustible gases emitted by the cylinders firing with excess fuel.

Continuously driven compressors are used, for example, in air-assisted fuel injection systems to provide improved fuel preparation. The air supply from such a compressor may be diverted to the exhaust system during deceleration while fuel continues to be supplied by the fuel injectors. In this mode, the injectors may deliberately be run with poorer air atomisation to exaggerate the effect of charge stratification and the quantity of fuel injected may be controlled in dependence upon the amount of heat to be generated in the exhaust system and the amount of air made available for completing the combustion in the afterburner.

With homogeneous charge engines using centre-point fuel injection via an intake manifold or multi-point fuel injection into the intake ports, deceleration is accompanied by a rich incomplete combustion of the homogeneous charge. This is the result of hysteresis caused by stored fuel wetting the walls of the intake port and manifold. Even if fuel injection is cut-off completely during the deceleration mode, a sudden excursion of exhaust emissions will still occur since the stored fuel is burnt in the combustion chamber with insufficient air but the duration of the excursion is short as the quantity of the stored fuel is finite and once used up the hydrocarbon emissions will subside. By progressively increasing the throttling of the intake, one can match the air to the reducing fuel quantity admitted into the combustion chamber to ensure an over-rich mixture.

It is possible to increase the severity of the throttling of the intake during deceleration, to produce very high concentrations of unburnt gas components, notably hydrogen and carbon monoxide. If additional air is injected into the exhaust system for a brief period during deceleration, an ignitable mixture can be produced and this may be ignited by a spark plug to burn as a flame upstream of a catalytic converter. Such a flame is of a brief duration and goes out as the accumulated fuel from the intake system is used up. The additional air can be timed to shut off when this combustible supply is depleted.

In the case of known diesel engines having a filter trap, the filter trap is usually only regenerated after it has been detected to be blocked. This is disadvantageous because engine performance will already have been degraded by a partly blocked filter. Furthermore, because of the extent of the blockage, regeneration takes a considerable time. In the present invention, use is made of the deceleration mode, which is entered frequently in normal driving each time the vehicle slows down, to burn off any soot in the filter trap and because this is done periodically, soot build up is avoided in the first instance.

In the case of a lean burn engine with a catalytic converter, which applies to both petrol and diesel engines, urban driving with frequent idling and light load operation will generally cause problems in keeping the converter alight. However, urban driving also comprises frequent periods of operation in the deceleration mode and the method of operation of the invention will result in frequent reheating of the catalytic converter.

In the case of a heavy vehicle with a small engine, heavy loading of the engine at high speed could result in exhaust gas temperatures in excess of the safe limit for the catalytic converter even if the converter is positioned some distance away from the engine. The invention allows the catalytic converter to be arranged even further away from the engine by providing periodic reheating in deceleration modes to maintain a high temperature in the converter.

Severe throttling of the air intake causes engine braking which is desirable in that it avoids the need for exhaust throttling which is sometimes carried out for this purpose. A further advantage of throttling during deceleration modes is that any resultant adverse effects on engine drivability caused by the excessively rich mixture in the combustion chamber will not generally be noticed.

The fact that effects on drivability are not noticeable during deceleration modes is also advantageous when supplying some engine cylinders with a rich mixture while cutting off the supply of fuel to others. This will naturally cause instability which could not be tolerated under other operating modes when power is taken from the engine. The changeover between fuelling modes should be carefully controlled to provide a smooth transition.

It should also be mentioned that it is not essential to fire the afterburner during each deceleration mode nor for the entirety of a deceleration mode. If a catalytic converter is measured or estimated to be sufficiently hot, then there will be no need to produce a combustible mixture by throttling down the intake nor to fire the afterburner.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
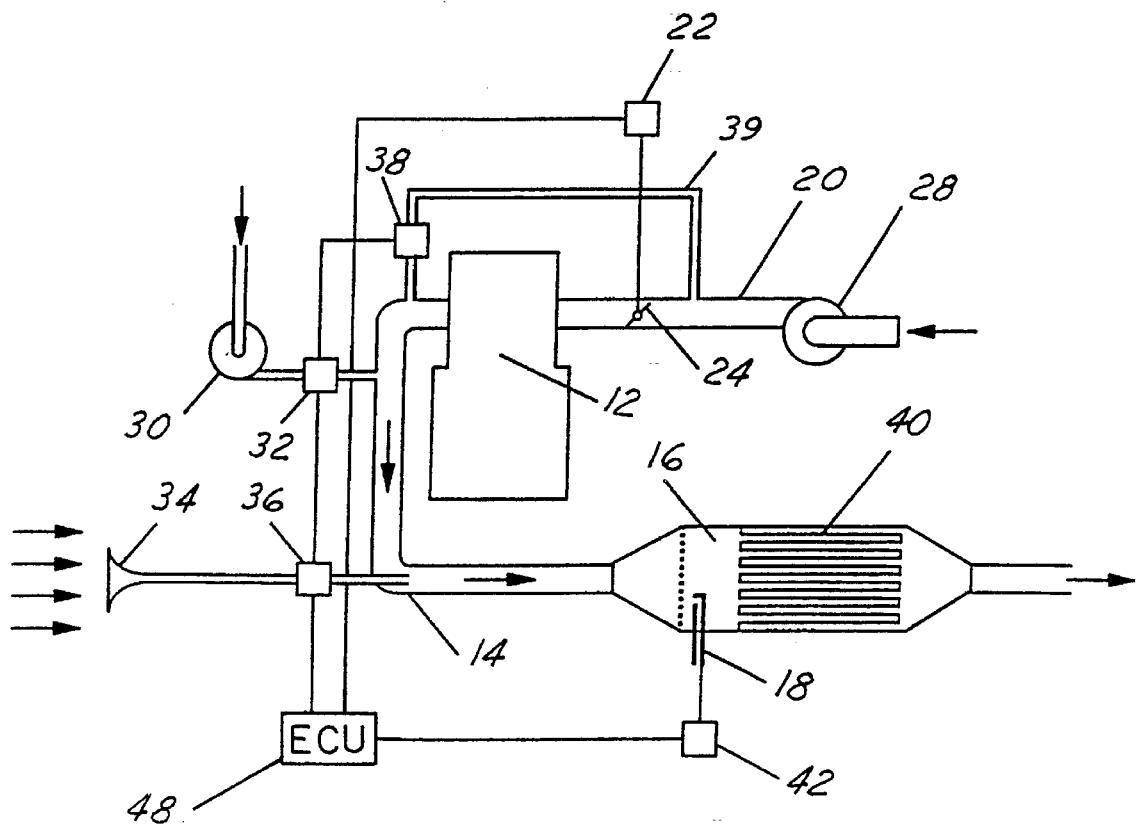
FIG. 1 a block diagram of a turbocharged engine having a control system for implementing the method of the present invention.

An engine 12 has an intake manifold 20 with a butterfly throttle valve 24 fitted with a regulating device 22 to throttle down the engine intake during deceleration modes. The engine has a turbocharger 28 driven by the exhaust system, only the compressor being shown in the drawing. The exhaust pipe 14 incorporates an element 40 which requires periodic heating, which may be a filter trap if the engine is a diesel engine, or may be a catalytic converter.

An afterburner chamber 16 having a spark igniter 18 is disposed at the upstream end of the element 40 and an oscillator 42 is provided to energise the igniter 18 when the afterburner is to fire.

The illustrated engine has several sources of additional air for the exhaust system but it should be made clear that in practice, these will not all be provided in the same engine and are alternatives to one another.

One of the possible sources of air comprises the turbocharger 28 itself which during deceleration mode will be running down in speed but still generating a positive air pressure. This may be supplied through a bypass 39 and an isolation valve 38 directly into the exhaust system.

A second option for introducing additional air into the exhaust pipe 14 consists of a continuously driven air compressor 30 and an isolating or regulating valve 32.

The last illustrated option for adding air to the exhaust system comprises an air scoop 34 connected by an isolation valve 36 to the exhaust system to supply ram air when the vehicle is moving at speed.

The various regulating valves and isolation valves can be actuated by an electronic control unit 48 which senses deceleration modes. The control unit also serves to control the spark igniter 18 within the afterburner chamber 16 and to position the throttle 24 through a regulator 22.

If additional air is to be supplied by starving some engine cylinders of fuel, then the control signal to the fuelling system will also be provided by the control unit 48.

The electronic control unit 48 is connected to sensors (engine speed and manifold depression) which are not shown in the drawing and which enable it to determine when the engine is in deceleration mode and the extent of engine overrun. When manifold depression is sufficiently high having regard to the engine speed, the air mass flow to the engine is reduced by throttling the intake and the oscillator 42 is enabled to generate sparks at the igniter 18 within the afterburner chamber 16.

If there is a risk of damage to the catalytic converter by overheating, then the electronic control unit 48 may be designed to prevent implementation of the method of the invention under certain conditions, if the catalytic converter is sensed to be too hot or if the afterburner has been in operation for an extended period, for example during a prolonged downhill run.

The fuelling while the engine is throttled is as it would be in a conventional engine and, as a result of the throttling, the mixture in the engine combustion chamber is enriched to the point that the exhaust gases contain a high concentration of combustible gases, in particular hydrogen and carbon monoxide, which can be ignited in the afterburner if further oxygen is made available. This further oxygen may in some cases already be present in the exhaust system but when an external source is required then any one or more of the above described sources may be used.

It is possible to make use of the periods when the afterburner is lit to purge a canister used to trap vapour emitted from the fuel tank. Such purging is also advisable at regular intervals, as the filters otherwise risk becoming saturated. If the stored vapours are recycled to the engine intake under normal operation, they tend to upset the engine calibration but burning off the excess vapour during deceleration modes will not noticeably affect drivability.

Each of the isolating valves described above may be connected in series with a non-return valve to ensure that even when the isolation valve is open, there is no risk of reverse flow of exhaust gases through the compressor, turbocharger or air scoop. Of course, such reverse flow is unlikely during correct operation as the exhaust back pressure is minimal during deceleration but must be prevented in the event of failure of any of the isolation valves.

Figure 2:
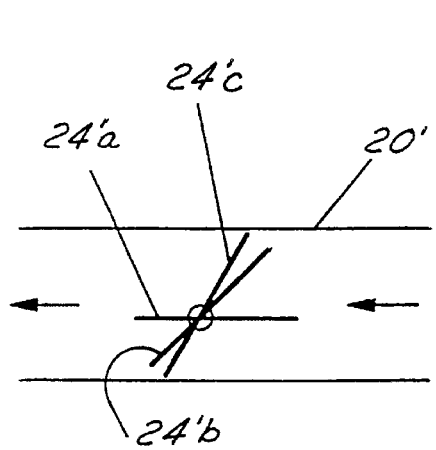
FIG. 2 shows schematically a butterfly throttle valve capable of automatically detecting when the engine is operating in deceleration mode by responding to manifold depression.

FIG. 2 shows a design of throttle valve sometimes found in Diesel engines. In compression ignition engine, load is controlled by regulation of the fuel and the intake air is normally not throttled. However, to avoid excessively lean mixtures at very light loads, it is known to fit a two-position butterfly throttle which partially closes off the intake manifold 20 during light load. The high load and light load positions of the butterfly are designated 24'a and 24'b respectively. In the method of the invention, the throttling is still more severe and the butterfly assumes the position designated 24'c.

The butterfly plate 24' in FIG. 2 differs from that of FIG. 1 in that its spindle is not centred on the plate. The result of this is that the butterfly plate will experience a small torque related to the manifold depression. If a spring acts to keep the plate in the position 24'b, it will remain in that position during steady speed idling but the higher manifold depression during overrun will result in the plate moving to position 24'c against the return force of the spring. In this case, the operation of the throttle is automatic and no external electronic control is required. Furthermore, the plate can close a switch to enable the oscillator 42 and switch on the supply of additional air.

Figure 3:
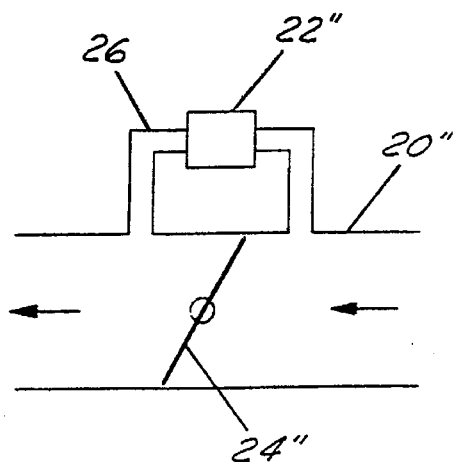
FIG. 3 shows schematically a butterfly throttle valve having a bypass passage which is controlled to reduce the bypass air during the deceleration mode.

In certain engines, such as conventional spark ignited engines, the air flow at idling speed is not controlled by the butterfly plate because this would lead to instability. Instead, the butterfly plate 24" is closed off completely and the air is supplied through a by-pass passage 26, as shown in FIG. 3. In such a case, the throttling required in the present invention is performed in the by-pass passages 26 with the aid of a regulating valve 22" controlled by the electronic control unit 48.

I claim:

1. A method of operating an internal combustion engine burning a fuel containing carbon and hydrogen, which method comprises the steps of:

a) determining when the engine is operating in a deceleration mode, b) reducing the throttle opening of the air intake to the engine only during deceleration modes below the throttle opening for steady speed idling to reduce the mass of air in each combustion charge when the engine is overrunning while continuing to admit fuel into the combustion chamber to result in excessively rich combustion in at least a region of the combustion charge and thereby create a proportion of combustible gases in the exhaust gas stream, c) ensuring the presence in the exhaust gas stream of additional air to mix with the combustible gases to achieve during deceleration modes an exhaust mixture having sufficiently high concentrations of combustible gases and oxygen to be ignitable, and d) igniting the mixture to burn as a flame within an afterburner chamber arranged upstream of an element of the exhaust system in order to heat the element during deceleration modes.

2. A method as claimed in claim 1, wherein the step of determining when the engine is in deceleration mode comprises comparing the manifold depression with a reference value determined by reference to the current engine speed.

3. A method as claimed in claim 1, wherein the step of reducing the throttle opening below the steady speed idle position comprises moving a butterfly plate of a butterfly valve to a position which obstructs the air flow more than its normal position during steady idling.

4. A method as claimed in claim 1, wherein the step of reducing the throttle opening below the steady speed idle position comprises at least partially closing a passage provided to by-pass a butterfly throttle valve.

5. A method as claimed in claim 1, in which the step of ensuring the presence in the exhaust gas stream of additional air comprises directing air from a compressor to the exhaust system during deceleration modes.

6. A method as claimed in claim 1, wherein the step of ensuring the presence in the exhaust gas stream of additional air comprises diverting air to the exhaust system from a turbocharger pressurising the intake system.

7. A method as claimed in any of claim 1, wherein the step of ensuring the presence in the exhaust gas stream of additional air comprises introducing ram air into the exhaust system from an air scoop generating a positive air pressure from vehicle movement.

8. A method as claimed in any of claim 1, wherein the step of ensuring the presence in the exhaust gas stream of additional air comprises cutting off the fuel supply to some engine cylinders while supplying other cylinders with an excessively rich mixture.

9. A method as claimed in claim 1, wherein the step of igniting the mixture comprises generating sparks within the afterburner chamber.

10. A method of operating an internal combustion engine according to claim 1, wherein said additional air comprises air from an external source.

11. A method of operating an internal combustion engine according to claim 1, wherein said additional air comprises unused air from the engine.

12. A method of operating an internal combustion engine according to claim 1, wherein said afterburner chamber comprises a catalytic converter.

13. A method of operating an internal combustion engine according to claim 1, wherein said afterburner chamber comprises a filter trap.

* * * * *